US011044270B2

(12) United States Patent
Kraemer et al.

(10) Patent No.: US 11,044,270 B2
(45) Date of Patent: Jun. 22, 2021

(54) USING PRIVATE THREAT INTELLIGENCE IN PUBLIC CLOUD

(71) Applicant: Carbon Black, Inc., Waltham, MA (US)

(72) Inventors: Jeffrey Albin Kraemer, Wellesley, MA (US); Sanket Choksey, Somerville, MA (US); Ranganathan Gopalan, Wayland, MA (US)

(73) Assignee: Carbon Black, Inc., Waltham, MA (US)

( * ) Notice: Subject to any disclaimer, the term of this patent is extended or adjusted under 35 U.S.C. 154(b) by 356 days.

(21) Appl. No.: 15/457,777

(22) Filed: Mar. 13, 2017

(65) Prior Publication Data

US 2017/0272469 A1   Sep. 21, 2017

Related U.S. Application Data

(60) Provisional application No. 62/308,311, filed on Mar. 15, 2016.

(51) Int. Cl.
*H04L 29/06* (2006.01)
*G06F 21/57* (2013.01)
*G06F 21/55* (2013.01)

(52) U.S. Cl.
CPC ............ *H04L 63/20* (2013.01); *G06F 21/552* (2013.01); *G06F 21/577* (2013.01);
(Continued)

(58) Field of Classification Search
CPC ......... H04L 63/20; H04L 67/02; H04L 29/06; G06F 19/00; G06F 21/55; G06F 21/57
See application file for complete search history.

(56) References Cited

U.S. PATENT DOCUMENTS

| 5,974,549 A | 10/1999 | Golan |
| 8,015,604 B1 | 9/2011 | Tidwell et al. |

(Continued)

FOREIGN PATENT DOCUMENTS

| EP | 2 750 069 A1 | 7/2014 |
| GB | 2502774 A | 5/2012 |

(Continued)

OTHER PUBLICATIONS

International Preliminary Report on Patentability, dated Sep. 27, 2018, from International Application No. PCT/US2017/022181, filed on Mar. 13, 2017. Eight pages.

(Continued)

*Primary Examiner* — Morshed Mehedi
*Assistant Examiner* — Kalish K Bell

(57) ABSTRACT

A distributed security system and method are disclosed that enable access to known threat events from threat intelligence feeds when the system includes public cloud components. A cloud-based security policy system stores observable events for security incidents detected by and sent from user devices within an enterprise network. The observable events include observable indicators for characterizing the observable events. The threat events within the feeds include threat indicators for characterizing the threat events. An on-premises connector within the enterprise network downloads the observable indicators from the security policy system and the threat indicators from the feeds. In response to determining that any observable indicators match any threat indicators, the on-premises connector provides access to the threat events and/or the observable events having the matching indicators. In one example, the on-premises connector generates opaque query strings for users on user devices to access the threat events/observable events having the matching indicators.

24 Claims, 8 Drawing Sheets

(52) U.S. Cl.
CPC ...... *H04L 63/1416* (2013.01); *H04L 63/1425* (2013.01); *H04L 63/1433* (2013.01); *H04L 2463/121* (2013.01)

(56) References Cited

U.S. PATENT DOCUMENTS

| | | | |
|---|---|---|---|
| 8,839,435 | B1 | 9/2014 | King |
| 9,165,142 | B1 | 10/2015 | Sanders et al. |
| 9,336,385 | B1 | 5/2016 | Spencer et al. |
| 9,648,045 | B2 | 5/2017 | Mooring et al. |
| 2006/0277539 | A1 | 12/2006 | Amarasinghe et al. |
| 2007/0150957 | A1 | 6/2007 | Hartrell et al. |
| 2008/0144821 | A1 | 6/2008 | Armstrong |
| 2009/0126017 | A1 | 5/2009 | Chahal |
| 2009/0193513 | A1* | 7/2009 | Agarwal ............ H04L 63/0227 726/15 |
| 2010/0017879 | A1 | 1/2010 | Kuegler et al. |
| 2010/0031361 | A1 | 2/2010 | Shukla |
| 2010/0077481 | A1 | 3/2010 | Polyakov et al. |
| 2013/0047255 | A1 | 2/2013 | Dalcher |
| 2013/0283370 | A1 | 10/2013 | Vipat et al. |
| 2014/0196148 | A1 | 7/2014 | Chahal |
| 2014/0289853 | A1* | 9/2014 | Teddy ................ H04L 63/1416 726/23 |
| 2015/0128274 | A1* | 5/2015 | Giokas ............... H04L 63/1416 726/23 |
| 2015/0326592 | A1 | 11/2015 | Vissamsetty et al. |
| 2015/0332048 | A1 | 11/2015 | Mooring et al. |
| 2015/0334126 | A1 | 11/2015 | Mooring et al. |
| 2016/0072836 | A1 | 3/2016 | Hadden et al. |
| 2016/0164893 | A1 | 6/2016 | Levi |
| 2017/0052821 | A1 | 2/2017 | Wu et al. |
| 2017/0124327 | A1 | 5/2017 | Kumbhar et al. |
| 2017/0155683 | A1* | 6/2017 | Singla .................. G06F 21/604 |
| 2017/0270296 | A1 | 9/2017 | Kraemer et al. |
| 2017/0272452 | A1 | 9/2017 | Kraemer et al. |
| 2017/0272462 | A1 | 9/2017 | Kraemer et al. |
| 2018/0091540 | A1 | 3/2018 | Solow et al. |

FOREIGN PATENT DOCUMENTS

| | | |
|---|---|---|
| WO | 2015/009296 A1 | 1/2015 |
| WO | 2017/003597 A1 | 1/2017 |
| WO | 2017/160760 A1 | 9/2017 |
| WO | 2017/160765 A1 | 9/2017 |
| WO | 2017/160770 A1 | 9/2017 |

OTHER PUBLICATIONS

International Preliminary Report on Patentability, dated Sep. 27, 2018, from International Application No. PCT/US2017/022167, filed on Mar. 13, 2017. Six pages.

International Preliminary Report on Patentability, dated Sep. 27, 2018, from International Application No. PCT/US2017/022173, filed on Mar. 13, 2017. Nine pages.

International Preliminary Report on Patentability, dated Sep. 27, 2018, from International Application No. PCT/US2017/022184, filed on Mar. 13, 2017. Eight pages.

Burger, E. et al., "Taxonomy Model for Cyber Threat Intelligence Information Exchange Technologies," Information Sharing & Collaborative Security, ACM, New York, Nov. 3, 2014, pp. 51-60. Ten pages.

Hunt, G. et al., "Detours: Binary Interception of Win32 Function," Proceedings of the 3rd USENIX Windows NT Symposium, Seattle, WA, Jul. 12-13, 1999. Ten pages.

Leitch, J., "Process Hollowing," http://www.autosectools.com, Nov. 1, 2014. Ten pages.

International Search Report and the Written Opinion of the International Searching Authority, dated May 26, 2017, from International Application No. PCT/US2017/022167, filed on Mar. 13, 2017. Twelve pages.

International Search Report and the Written Opinion of the International Searching Authority, dated May 8, 2017, from International Application No. PCT/US2017/022173, filed on Mar. 13, 2017. Sixteen pages.

International Search Report and the Written Opinion of the International Searching Authority, dated May 24, 2017, from International Application No. PCT/US2017-022181, filed on Mar. 13, 2017. Fourteen pages.

International Search Report and the Written Opinion of the International Searching Authority, dated May 8, 2017, from International Application No. PCT/US2017/022184, filed on Mar. 13, 2017. Fifteen pages.

Harrell, "Process Hollowing Meets Cuckoo Sandbox", Feb. 2015, Journey Into Incident Response, pp. 1-7.

Monti, E., "Analyzing Malware Hollow Processes," Mar. 2011, SpiderLabs Blog, trustwave.com. Twelve pages.

Nayyar, H., "An Opportunity in Crisis," 2014, SANS Institute. Ninety-four pages.

"VirtualAllocEx Function," 2017, microsoft.com. Six pages.

* cited by examiner

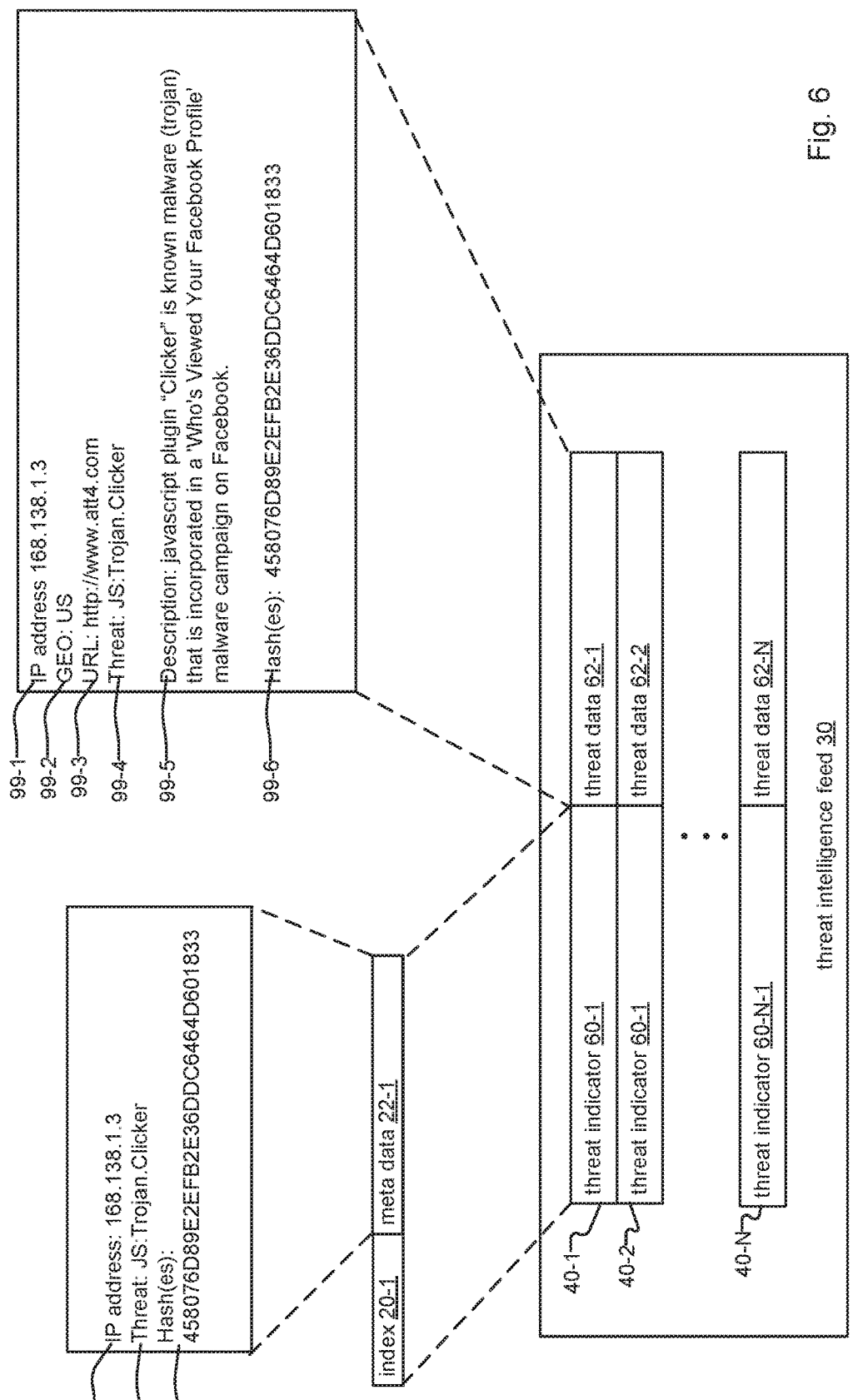

USING PRIVATE THREAT INTELLIGENCE IN PUBLIC CLOUD

RELATED APPLICATIONS

This application claims the benefit under 35 USC 119(e) of U.S. Provisional Application No. 62/308,311 filed on Mar. 15, 2016, which is incorporated herein by reference in its entirety.

BACKGROUND OF THE INVENTION

Data security incidents can pose a major threat to businesses. The incidents are often associated with cyber-related attacks that target devices within enterprise networks of businesses and sensitive data stored on the devices. Attackers typically utilize various malicious software components, or malware, and associated delivery/attack mechanisms and methods for launching these attacks.

Malware is often designed to disrupt network communications, gain control over computers or networks, or secretly gather personal information about users, businesses, and government entities. Malware typically includes viruses, trojans, adware, and spyware, to list a few examples. Malware and the delivery mechanisms employed by attackers to disrupt business operations and breach data privacy are collectively referred to as Tools, Tactics, and Procedures (TTPs).

SUMMARY OF THE INVENTION

Businesses are increasingly utilizing distributed security systems to observe and track data security incidents that occur within their enterprise networks, and to determine any threats that the incidents may pose to devices and users of the devices in the enterprise networks. For this purpose, these systems typically first identify and store details for each incident and observable events associated with the incidents, to a security policy system of the distributed security system. Then, the security policy system compares the observable events to threat events of known threats, where the threat events are often obtained by third-party threat intelligence feeds.

Observable events are highly sensitive and valuable information for each business organization. Each observable event typically includes an observable indicator for identifying and characterizing the observable event, and raw observable data for each observable event. The observable indicator is obtained or derived from the observable raw data. Observable events include stateful information for and measureable events associated with data security incidents detected within the enterprise networks of the businesses. In examples, observable events include Internet Protocol (IP) addresses and fully-qualified domain names (FQDNs) of data traffic sent to devices, and unique hash values calculated for specific instances of software downloaded to the devices or included in email attachments.

In a similar fashion, threat events are highly sensitive and proprietary information for the entities that own and maintain threat intelligence feeds. Each threat event typically includes raw threat data for each threat event and a threat indicator for identifying and characterizing each threat event. The threat indicator is obtained or derived from the raw threat data. The threat data includes information for known attackers/threat actors, detailed information for identified instances of malware such as hashes calculated for and universally-accepted names associated with the malware, and well-established TTPs for launching cyber attacks using the malware, in examples. Examples of threat indicators include IP addresses, "Subject" lines of email messages, fully qualified domain names (FQDNs), hashes calculated for files such as attachments to email messages using various hashing algorithms (e.g. MD5, SHA256), email "sender" addresses, and Universal Resource Locators (URLs).

Threat events and observable events are maintained separately by different entities and for different purposes. Third-party entities that own and maintain the threat intelligence feeds gather information for threat events across multiple businesses and different business sectors, and often with international scope, and store and distribute the threat events within the threat intelligence feeds. The threat intelligence feeds are often included in secure private networks for enhanced security, and access to the threat events in the feeds are typically provided as a subscription service to the businesses. Examples of private, subscription-based threat intelligence feeds include Information Sharing and Analysis Centers (ISAC) for different business sectors, and Collaborative Research Into Threats (CRITs) for different research and/or academic communities. In contrast, each business tracks and stores its own observable events for incidents so that they are accessible only by the business itself. Businesses then typically execute lookups of their observable events against the threat events to determine whether the observable events are associated with known threats.

Though observable events and threat events are maintained separately by different entities and for different purposes, there is often overlap among the contents of the observable events and the threat events. In one example, a hash calculated for a downloaded file in an observable event may also be the same value as that of a well-known hash for a computer virus stored as a threat event within one or more threat intelligence feeds. In another example, IP addresses and FQDNs within an observable event can be looked up against IP address and FQDN "whitelist" and/or "blacklist" threat intelligence feeds, which in turn include threat events of known good (whitelist) and known bad (blacklist) IP addresses and FQDNs. By comparing observable events for incidents to threat events included within the threat intelligence feeds, the businesses can determine whether incidents occurring within their enterprise networks are associated with actual threats and to determine their scope and impact of the threats.

The observable events and threat events are often logged to event management systems. One example of an event management system that consumes observable events and threat events is a Security Information and Event Manager (SIEM). One or more SIEMs typically reside within the enterprise networks of businesses. SIEMs analyze information concerning the observable events and threat events in log messages sent to the SIEM from the devices in the enterprise networks, and store the log messages for compliance and auditing purposes, in examples. The SIEMs analyze the log messages to identify similar events and to determine trends and correlations across the events and can generate alert messages in response.

Increasingly, major components of these distributed security systems are being implemented using a Software as a Service (SaaS) model to save on cost and complexity. In one example, the majority of the hardware and software components for tracking the incidents and storing observable events for the incidents for each business can be provided by a third-party security policy system accessed across a public network, or cloud. Such a security policy system is also referred to as a remote security policy system. The business clients can access the remote security policy system over the internet. Each business client is a subscriber of the remote security policy system. Users such as security personnel of each business client can access the remote security policy system using a thin client such as a web browser or other application running on a user device. The entity that owns and manages the remote security policy system is typically a third-party vendor. In a typical mode of operation, a remote security policy system receives observable events collected within and sent from the enterprise network of each business client. The remote security policy system then analyzes, logs, and stores the observable events for each business client.

The owners/administrators of the threat intelligence feeds guard their sensitive threat events. Disclosure of the threat events burns the information and makes it become irrelevant. It can also provide would-be attackers with a "blueprint" for attacks.

Because providers of threat intelligence feeds might not enable access to their feeds from remote security policy systems, businesses using remote security policy systems cannot access threat events which are likely up-to-date and relevant to their business for lookup and/or comparison to observable events for that business that are maintained within the remote security policy systems. Moreover, the subscribers of the threat intelligence feeds such as ISACs are often legally prohibited from sharing their threat data with anyone else, especially a third-party vendor hosting a remote security policy system that tracks observable events of incidents for possibly multiple businesses.

One aspect of the present invention concerns an approach that overcomes the inability of current distributed security systems to access threat events. It includes an on-premises connector in each business' enterprise network. The on-premises connector can obtain the observable indicators of the observable events from the remote security policy system, and store the observable indicators locally, such as to a table or database. The on-premises connector can similarly obtain the threat indicators of the threat events from the threat intelligence feeds to which each business subscribes, and store the threat indicators to another local table or database. This enables localized, secure private matching within the client's enterprise network between the locally stored observable indicators and locally stored threat indicators within the on-premises connector. Using the matching indicator(s), each business can access the corresponding observable events/threat events from their respective sources while preserving the data security of the sources and their business. The on-premises connector can then include information concerning the observable events/threat events for the matching indicators in a log message, and send the log message to a SIEM, for example.

Usage of the on-premises connector has additional advantages. Upon finding any matching indicators, the on-premises connector can also provide the ability for users of user devices within the enterprise network of each business to directly access the threat events for the matching indicators. For this purpose, in one example, the on-premises connector can send generically formed URL query strings that reference the matching indicators to the user devices. Also, storing local versions of the observable indicators and threat indicators and executing matches among the local versions of the indicators within the on-premises connector is more efficient than storing copies of and executing matches upon the observable events and the threat events, and enables housekeeping operations among the indicators.

The use of the opaque URL query strings allows an administrator on a user device, in one example, to access relevant threat events without revealing to the threat intelligence feeds that a "hit" or match between an observable event and a threat event in the feeds has occurred. The opaque nature of the query strings also hides the fact that the requests are coming from user devices in the enterprise network, while also preserving the data integrity and security between the business as a subscriber of the threat intelligence feed.

Secondly, because only the indicators of the observable events and the threat events are downloaded/pushed to the on-premises connector and not the entirety of the observable events and the threat events, storage of the indicators can scale with an increasing number of observable entries/threat entries, and matching operations upon the indicators can be executed with computational efficiency. Finally, policy-based actions and maintenance operations can be executed upon the indicators. Such operations include purging of observable indicators within the on-premises connector for observable events that the security policy system indicates are no longer temporally relevant, and purging of threat indicators within the on-premises connector for threat events which the one or more threat intelligence feeds indicate are no longer associated with known threats.

In general, according to one aspect, the invention features a distributed security system that uses one or more threat intelligence feeds that store threat events associated with security incidents, the threat events including threat indicators for characterizing the threat events. The distributed security system includes a security policy system that stores observable events for security incidents detected by and sent from user devices within an enterprise network, and includes an on-premises connector located within the enterprise network. The observable events include observable indicators for characterizing the observable events. The on-premises connector compares the observable indicators from the security policy system with the threat indicators from the one or more threat intelligence feeds. In response to determining that any observable indicators match any threat indicators, the on-premises connector provides access to the threat events and the observable events having the matching indicators.

The on-premises connector typically provides access to the threat events having the matching indicators by sending messages including the threat events associated with the matching indicators to users on the user devices and/or to event management systems such as a Security Information and Event Manager (SIEM).

The on-premises connector preferably provides access to the threat events having the matching indicators by creating opaque URL query strings for accessing the threat events for the matching indicators in the one or more threat intelligence feeds, and sending the opaque URL query strings to users on the user devices and/or to a SIEM. In a similar fashion, the on-premises connector preferably provides access to the observable events having the matching indicators by creating opaque URL query strings for accessing the observable events for the matching indicators in the security policy system, and sending the URL query strings to users on the user devices and/or to a SIEM.

The on-premises connector is typically a software application executing upon at least one of the user devices within the enterprise network. Preferably, the security policy system is accessed over a public network that the user devices access.

The user devices include a runtime agent software application executing on the user devices. The runtime agent detects the security incidents and sends the observable events for the security incidents to the security policy system. Typically, the security policy system is located in a network that is remote to the enterprise network and that is remote to networks that include the one or more threat intelligence feeds.

A Security Information and Event Manager (SIEM) is also preferably located within the enterprise network. In one implementation, in response to the on-premises connector determining that any observable indicators match any threat indicators, the on-premises connector provides access to the threat events and the observable events having the matching indicators by including the threat events and the observable events in log messages, and sending the log messages to the SIEM.

In one implementation, the on-premises connector includes a threat indicators table for locally storing the threat indicators of the threat events from the one or more threat intelligence feeds, and includes an observable indicators table for locally storing the observable indicators of the observable events from the security policy system.

The threat events additionally include threat data that provide details of the threat events, and the observable events additionally include observable data that provide details of the observable events.

In general, according to another aspect, the invention features a method for retrieving information associated with security incidents from one or more threat intelligence feeds that store threat events associated with security incidents. The method includes one or more user devices on an enterprise network detecting observable events associated with security incidents. The method also stores the observable events within a security policy system. The observable events include observable indicators for characterizing the observable events.

The method also compares the observable indicators from the security policy system with threat indicators of the threat events from the one or more threat intelligence feeds, and matches the observable indicators to the threat indicators to determine matching indicators. The method then provides access to the threat events and the observable events having the matching indicators.

The method typically provides access to the threat events having the matching indicators by sending messages including the threat events having the matching indicators to users on the user devices and/or to a SIEM.

Preferably, the method provides access to the threat events having the matching indicators by creating opaque URL query strings for accessing the threat events for the matching indicators in the one or more threat intelligence feeds, and sending the opaque URL query strings to users on the user devices and/or to a SIEM. In a similar fashion, the method preferably provides access to the observable events having the matching indicators by creating opaque URL query strings for accessing the observable events for the matching indicators in the security policy system and sending the opaque URL query strings to users on the user devices and/or to a SIEM.

In one implementation, the method compares the observable indicators from the security policy system with the threat indicators from the one or more threat intelligence feeds by storing the observable indicators obtained from the security policy system as local observable indicators within an on-premises connector of the enterprise network, storing the threat indicators obtained from the one or more threat intelligence feeds as local threat indicators within the on-premises connector, and comparing the local observable indicators against the local threat indicators.

The user devices include a runtime agent software application executing on the user devices, the runtime agent detecting the security incidents and sending the observable events for the security incidents to the security policy system.

In one implementation, the security policy system is located in a network that is remote to networks that include the one or more threat intelligence feeds and that is remote to the enterprise network.

The method also provides access to the threat events and the observable events having the matching indicators by including the threat events and the observable events in log messages, and sending the log messages to a SIEM located within the enterprise network.

The threat indicators typically include IP addresses, subject lines of email messages, fully qualified domain names (FQDNs), hashes calculated for files, sender addresses of the email messages, and/or Universal Resource Locators (URLs).

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6 is a block diagram that provides detail for storage and exemplary content of threat events within a threat intelligence feed.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
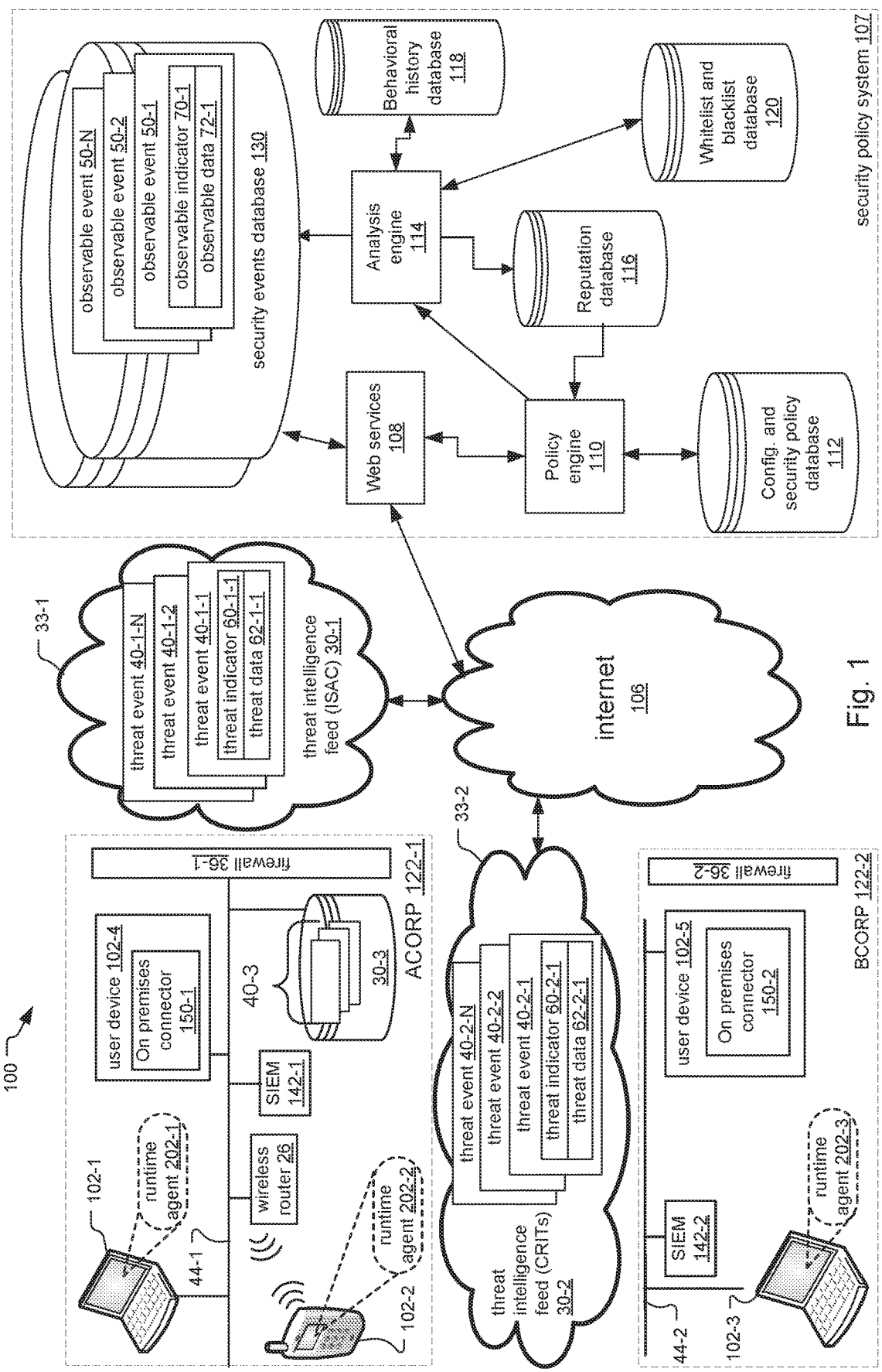
FIG. 1 is a schematic diagram of a distributed security system that tracks observable events detected for data security incidents which occur within enterprise networks of two exemplary businesses, where the businesses communicate over the internet with a remote security policy system that stores the observable events for each of the businesses, and where the businesses also communicate with one or more threat intelligence feeds that store threat events.

FIG. 1 shows a distributed security system 100 to which the invention is applicable. Devices within enterprise networks 122-1 and 122-2 of exemplary business clients ACORP and BCORP, respectively, communicate over the internet 106 with a security policy system 107. In a preferred embodiment, the security policy system 107 is remote security policy system, where the security policy system is cloud-based and located in a network that is remote to the enterprise network 122 of each business, and is typically implemented as a Software as a Service (SaaS). In the SaaS implementation, a separate logical instance of the security policy system 107 is usually maintained for each business client.

From their enterprise networks 122-1/122-2, businesses ACORP and BCORP access one or more threat intelligence feeds 30 including threat events 40. Preferably, the threat intelligence feeds 30 are repositories of threat events 40 located in secure private networks 33 to which each of businesses subscribe and access over the internet 106.

In the illustrated figure, an Information and Analysis Sharing Center (ISAC) threat intelligence feed 30-1 and a Collaborative Research Into Threats (CRITs) feed 30-2 are located within separate secure private networks 33-1 and 33-2, respectively. In addition, enterprise network 122-1 for ACORP also includes a local threat intelligence feed 30-3 of ACORP-specific private threat events 40, which ACORP maintains solely for its own business divisions and does not share with any other business or third-party entity.

Each threat event 40 in each threat intelligence feed 30 includes a threat indicator 60 that characterizes each threat event and threat data 62 which includes the raw data for each threat event 40. Threat intelligence feed 30-1 includes one or more threat events 40-1-1 through 40-1-N. In one example, threat event 40-1-1 includes threat indicator 60-1-1 and threat data 62-1-1. Threat intelligence feed 30-2 includes one or more threat events 40-2-1 through 40-2-N, and in another example, threat event 40-2-1 includes threat indicator 60-2-1 and threat data 62-2-1. Threat events 40-3 are included within local threat intelligence feed 30-3.

These threat indicators typically include IP addresses, subject lines of email messages, fully qualified domain names (FQDNs), hashes (MD5 or SHA256) calculated for files, sender addresses of the email messages, and Universal Resource Locators (URLs).

Enterprise network 122-1 of ACORP also includes user devices 102-1, 102-2, and 102-4, a SIEM 142-1, a wireless router 26, and a firewall 36-1 that communicate over local network 44-1. Examples of user devices 102 include smartphones, tablet computing devices, servers, and laptop computers running operating systems such as Windows, Mac OS X, Android, Linux, or IOS, in examples. Each user device 102 includes one or more applications/processes that execute upon the operating systems of the user devices 102. Relevant applications include an on-premises connector 150-1 running on at least one user device 102-4 in the enterprise network 122-1, and an optional runtime agent 202 running on the user devices 102 for detecting data security incidents and observable events 50 associated with the incidents upon or associated with each user device 102. User device 102-1 includes runtime agent 202-1. User device 102-2 includes runtime agent 202-2 and communicates over the local network 44-1 via a wireless network provided by the wireless router 26.

Enterprise network 122-2 of BCORP also includes user devices 102-3 and 102-5, a SIEM 142-2, and a firewall 36-2 that communicate over local network 44-2. An on-premises connector 150-2 executes upon at least one user device 102-5 in the enterprise network 122-2. User device 102-3 includes runtime agent 202-3.

In response to detecting security incidents and observable events 50 associated with the security incidents within the enterprise networks 122, the runtime agents 202 send information concerning the security incidents and the observable events 50 for storage and analysis over the internet 106 to the security policy system 107. The security policy system 107 analyzes and stores the observable events 50 for the incidents to one or more security event databases 130.

Observable events 50-1 through 50-N are included in the security events database 130. Each observable event 50 includes an observable indicator 70 that characterizes the observable event 50 and observable data 72 that includes the raw data of each observable event 50. In one example, observable event 50-1 includes observable indicator 70-1 and observable data 72-1. When the security policy system 107 manages and stores observable events 50 for multiple businesses, in one implementation, the observable events 50 are stored to a separate security events database 130 that the security policy system 107 maintains for each business client. However, alternative implementations are possible, such as a single security events database 130 having a multi-tenant data architecture. This enables observable events 50 for different businesses to be stored and accessed in a secure and isolated fashion in the same conceptual database 130.

The security policy system 107 also includes a web services component 108, an analysis engine 114, a behavioral history database 118, a policy engine 110, a reputation database 116, a configuration and security policy database 112, and a whitelist and blacklist database 120. The web services component 108 receives security policies requested from user devices 102-1 to 102-n and forwards the requests to the policy engine 110. The policy engine 110 searches for security policies in the configuration and security policy database 112 and reputation database 116.

The analysis engine 114 calculates trust (or reputation) scores to determine the trustworthiness of the applications and whether the applications are malicious or benign.

In the illustrated example, the security policy system 107 also includes a behavioral information database 118 that stores behavioral information about applications received from user devices 102-1 to 102-n and a whitelist/blacklist database 120 that stores records of whitelisted and blacklisted applications.

Figure 2:
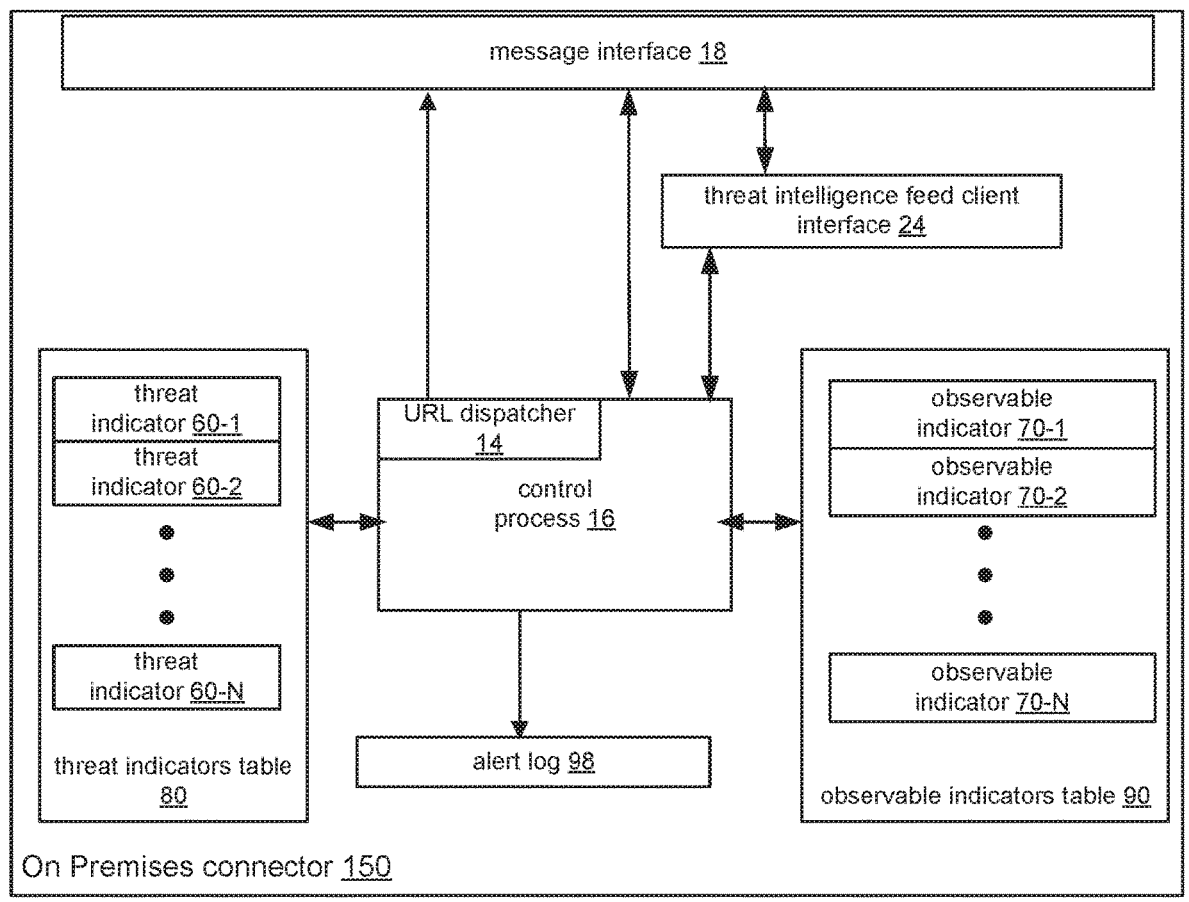
FIG. 2 is a block diagram of an on-premises connector of the present invention that resides in an enterprise network of a business, where the on-premises connector obtains and stores threat indicators of threat events from the one or more threat intelligence feeds, and obtains and stores observable indicators of the observable events from the remote security policy system.

FIG. 2 shows detail for an on-premises connector 150 within an enterprise network 122 of a business. The on-premises connector 150 includes a message interface 18, a threat intelligence feed client interface 24, a control process 16, an alert log 98, a threat indicators table 80, and an observable indicators table 90. The control process 16 includes a URL dispatcher 14.

The threat intelligence feed client interface 24 enables the business to access to one or more subscription-based/remote threat intelligence feeds 30, such as the ISAC threat intelligence feed 30-1 and the CRITs threat intelligence feed 30-2. For this purpose, the control process 16 passes control to the threat intelligence feed client interface 24, which in turn sends messages over the message interface 18 to exchange security credentials with the feeds 30. Once the feeds 30 validate the on-premises connector 150 (and therefore the business including the on-premises connector 150) as a legitimate subscriber, the on-premises connector 150 can then request threat indicators 60 of threat events 40 from the threat intelligence feeds 30. The feeds may also be acquired via an on-premises Threat Repository system, such as CRITS, which may be subscribing to the threat intelligence feed, in one example. The on-premises connector 150 then stores the obtained threat indicators locally to a threat indicators table 80. In a similar vein, the on-premises connector 150 obtains observable indicators 70 of observable events 50 from the security policy system 107 and stores the obtained observable indicators 70 locally to an observable indicators table 90.

The control process 16 obtains the threat indicators 60 and observable indicators 70 by either downloading all indicators 60/70 from their respective sources, and/or by receiving indicators incrementally. The control process 16 applies a time stamp to each threat indicator 60 and observable indicator 70 as they are stored to the threat indicators table 80 and observable indicators table 90, respectively. User devices 102 can also register with the on-premises connector 150 to receive alert messages and other information sent from the on-premises connector 150. The control process 16 communicates with the security policy system 107, the threat intelligence feeds 30, and the devices within the enterprise networks 122 via its message interface 18.

In response to receiving a threat indicator 60 which matches an observable indicator 70, or receiving an observable indicator 70 which matches a threat indicator 60, the URL dispatcher 14 generates an opaque URL search string that references an associated resource within the security policy system 107. The resource, in turn, provides access to the observable event 50 in the security events database 130 characterized by the observable indicator 70. NOTE: the URL dispatcher may also provide an opaque URL search string for providing access to the threat event 40 in the threat intelligence feed(s) 30.

The control process 16 sends the opaque URL search strings in messages to the users on the user devices 102 that registered to receive the messages. The users can then extract the opaque URL search strings from the messages, and issue queries including the URL search strings for threat events 40 directly against the threat intelligence sources 30 and issue queries including the URL search strings for observable events 50 directly against the security policy system 107. In one example, the opaque nature of the URL search strings hides from the threat intelligence feed(s) 30 that the user devices 102 are the originators of the requests for the threat events 40. From the perspective of the threat intelligence feed(s) 30, the requests from the user devices 102 for threat events 40 appear to originate from the on-premises connector 150, and the requests do not trigger an indication of a "hit" or match within the threat intelligence feed(s) 30. The same holds true for indications of a match within the security policy system 107.

In addition, the control process 16 can be programmed to obtain threat indicators 60 and observable indicators 70 based on specific criteria. Examples include obtaining only those observable indicators 70 since the last update to the observable indicators table 90, obtaining only those threat indicators 60 that include a specified IP address "200.1.1.20," and requesting updates to specified indicators 60/70. The control process 16 also executes housekeeping tasks among the threat indicators table 80/observable indicators table 90, such as purging/deleting indicators 60/70 that are no longer temporally relevant or that have "aged out" based on their time stamp relative to the current time. The control process 16 can also save events associated with these operations to an alert log 98, and create log messages including threat events 40 and observable events 50 for sending to a SIEM 142.

Figure 3:
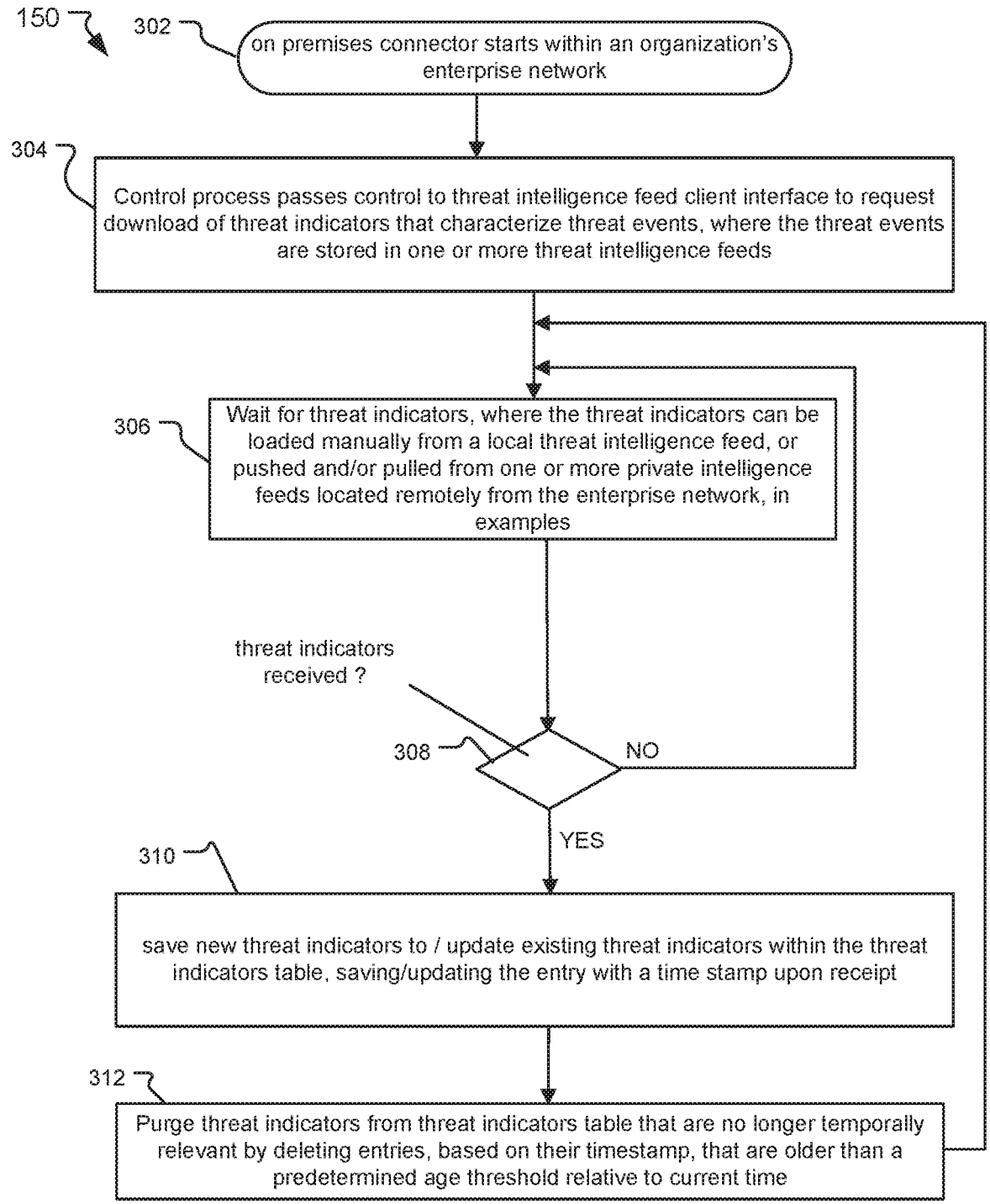
FIG. 3 is a flow diagram describing a method of the on-premises connector for obtaining, locally storing, and maintaining threat indicators of threat events from one or more threat intelligence feeds.

FIG. 3 describes a preferred method of the on-premises connector 150 for obtaining, storing, and maintaining threat indicators 60 of threat events 40 stored in one or more threat intelligence feeds 30.

In step 302, the on-premises connector 150 starts within an organization's enterprise network 122. According to step 304, the control process 16 passes control to the threat intelligence feed client interface 24, which in turn requests downloading of threat indicators 60 that characterize threat events 40 stored in one or more threat intelligence feeds 30.

FIG. 6 provides more detail for threat events 40 stored within the threat intelligence feeds 30. In one implementation, each threat event 40 is an entry or "row" in a conceptual table that is both indexed and characterized by a threat indicator 60 of each threat event 40. Each threat event 40 also includes threat data 62 that includes the raw data or details of each threat event 40.

Each threat indicator 60 includes an index 20 and meta data 22. The index 20 is a unique number that identifies each threat event 40. Meta data 22, on the other hand, includes a subset of the threat data 62. In the illustrated example, the threat data 62-1 includes various data fields 99 or items 99-1 through 99-6.

Exemplary contents of threat data 62-1 for threat event 40-1 are shown. The threat data 62-1 includes TTPs such as an IP address, geographic location from where the threat originated, a URL, and the name of the threat, in examples. The entirety of the exemplary threat data 62-1 and associated items 99 within the threat data 62-1 is described herein below:

IP address 168.138.1.3 (reference 99-1)
GEO:US (reference 99-2)
URL: http://www.att4.com (reference 99-3)
Threat: JS:Trojan.Clicker (reference 99-4)
Description: javascript plugin "Clicker" is known malware (trojan) that is incorporated in a 'Who's Viewed Your Facebook Profile' malware campaign on Facebook. ((reference 99-5)
MD5 hash: 458076D89E2EFB2E36DDC6464D601833 (reference 99-6))

Meta data 22-1 includes a subset of the items 99 within the threat data 62-1. The items 99 within the meta data 22 characterize the threat events 40 and enable context-sensitive matching between threat indicators 60 of threat events 40 and observable indicators 70 of observable events 50. In the example, the meta data 22-1 includes such items 99 as item 99-1 for IP address 168.138.1.3, item 99-4 for the name of the threat (e.g. JS: Trojan.Clicker, a well-known javascript plugin associated with malware), and item 99-6 for an MD5 hash value calculated for the plugin, with value 458076D89E2EFB2E36DDC6464D601833.

Returning to FIG. 3, in step 306, the control process 16 waits for threat indicators 60, where the threat indicators 60 can be loaded manually from a local threat intelligence feed 30-3, or pushed and/or pulled from one or more threat intelligence feeds 30-1/30-2 located remotely from the enterprise network 122, in examples. In step 308, if threat indicator(s) are received, the method transitions to step 310. Otherwise, the method transitions back to step 306.

In step 310, the control process 16 saves new threat indicators 60 to the threat indicators table 80, or updates existing threat indicators 60 within the threat indicators table 80. The control process 16 applies a time stamp to new threat indicators 60 or updates the time stamp of existing threat indicators 60.

According to step 312, the control process 16 purges any threat indicators 60 from the threat indicators table 80 that are no longer temporally relevant by deleting entries, based on their timestamp, that are older than a predetermined age threshold relative to current time. In another example, the control process 16 can provide additional housekeeping tasks upon the threat indicators 60 in the threat indicators table 80. This includes removal of threat indicators 60 from the threat indicators table 80 for threat events 40 which one or more threat intelligence feeds 30 no longer include.

Figure 4:
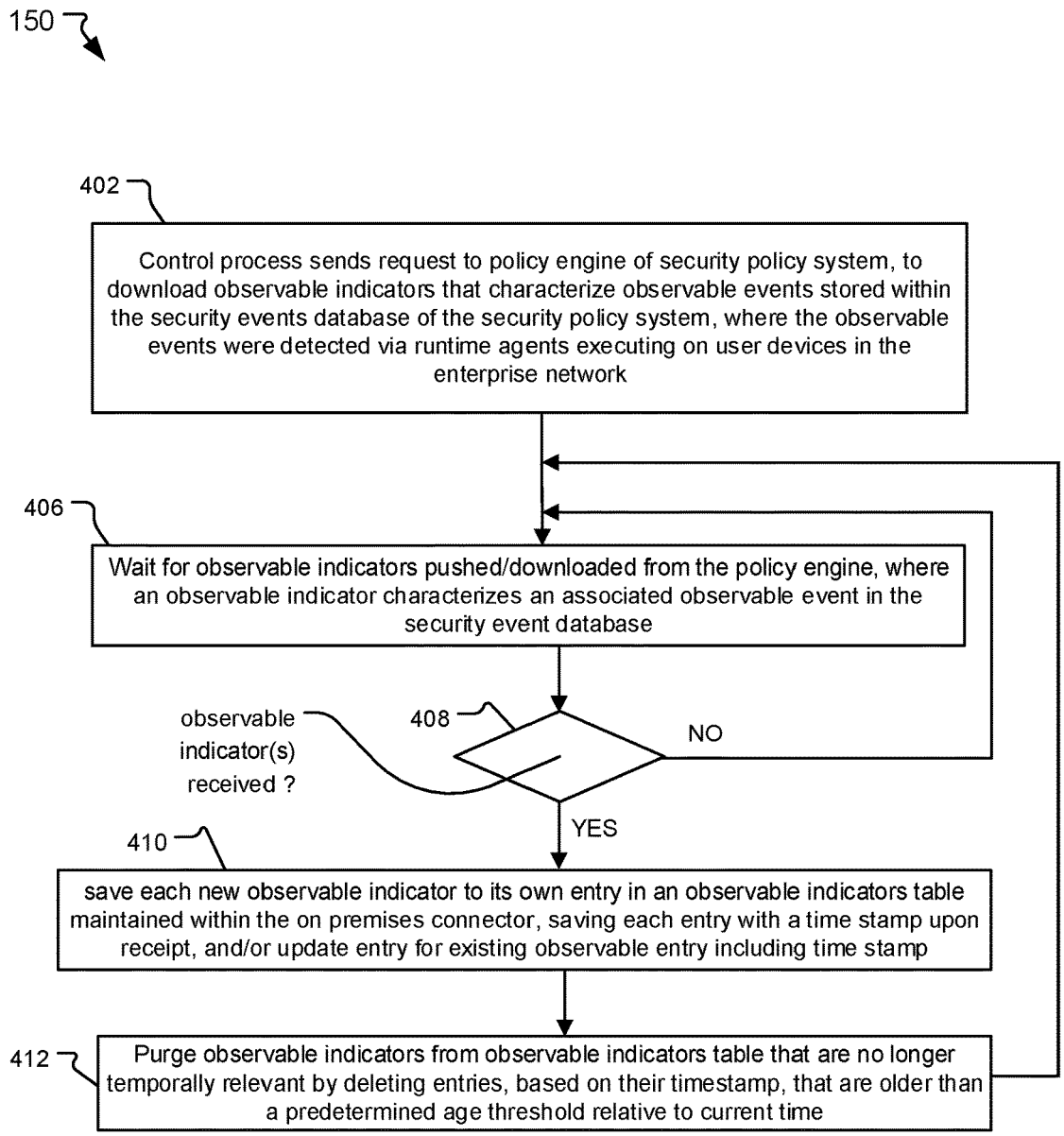
FIG. 4 is a flow diagram describing a method of the on-premises connector for obtaining, locally storing, and maintaining observable indicators of observable events from the remote security policy system.

FIG. 4 describes a preferred method of the on-premises connector 150 for obtaining, storing, and maintaining observable indicators 70 of observable events 50 stored in the security events database 130 of the security policy system 107.

In step 402, the control process 16 of the on-premises connector 150 sends a request to the policy engine 110 of the security policy system 107, to download observable indicators 70 that characterize observable events 50 stored in the security events database 130 of the security policy system 107. The observable events 50 were detected via runtime agents 202 executing on user devices 102 in an enterprise network 122.

Figure 7:
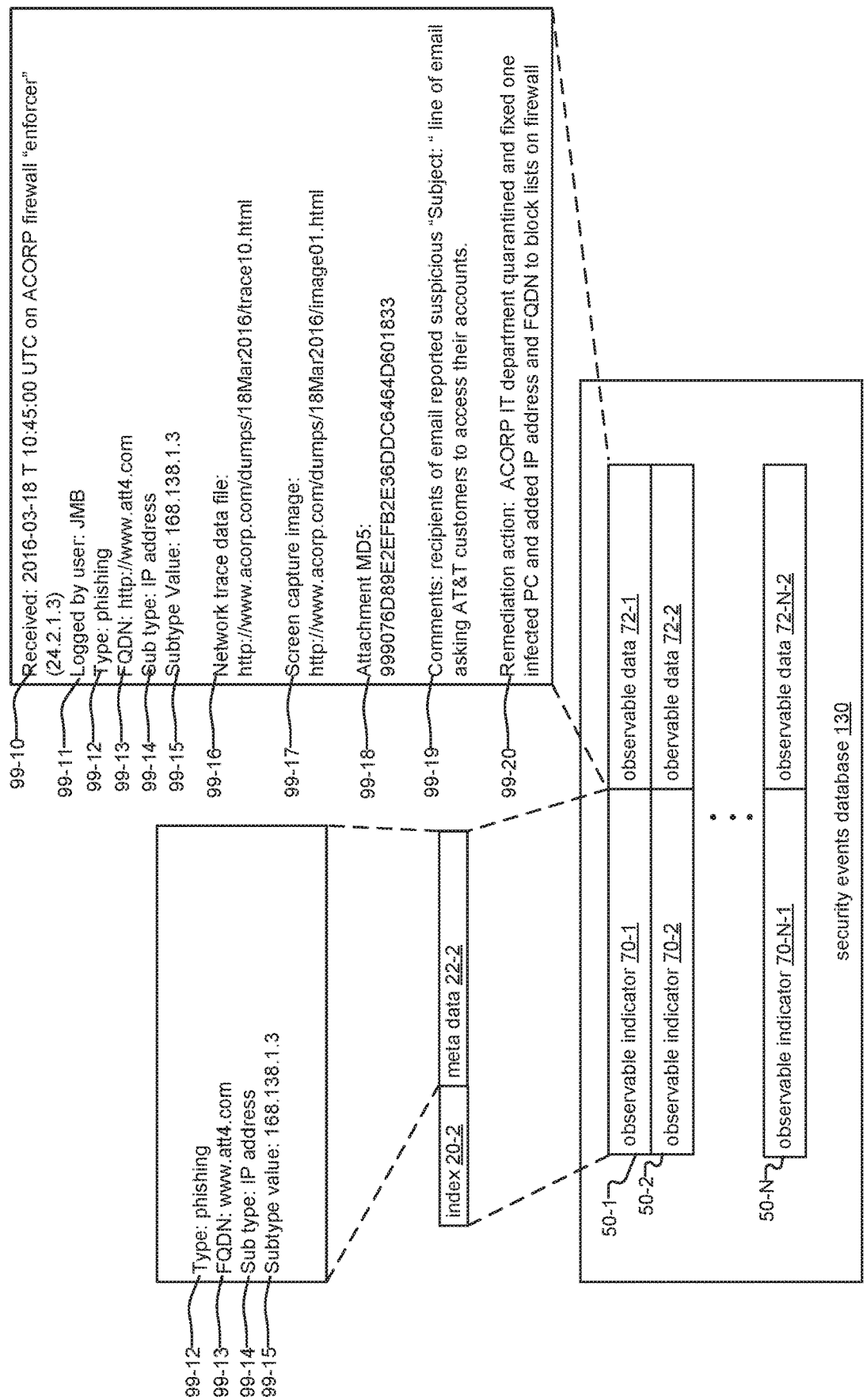
FIG. 7 is a block diagram that provides detail for storage and exemplary content of observable events within a security events database of the remote security policy system.

FIG. 7 provides more detail for observable events 50 stored within the security events database 130. In one implementation, each observable event 50 is an entry or "row" in a conceptual table that is both indexed and characterized by an observable indicator 70 of each observable event 50. Each observable event 50 also includes observable data 72 that provides the raw data or details of each observable event 50.

Each observable indicator 70 includes an index 20 and meta data 22. The index 20 is a unique number that identifies each observable event 50 within the security events database 130. Meta data 22, on the other hand, includes a subset of the observable data 72. In the illustrated example, the observable data 72-1 includes various items 99-10 through 99-20. Meta data 22-1 includes a subset of the items 99 within the observable data 72-1.

Exemplary contents of observable data 72-1 for observable event 50-1 are shown. The observable data 72-1 includes items 99 such as a time stamp, type of threat, names of data capture files which record network activity during the detected observable event 50-1, and remediation actions taken in response. The entirety of the exemplary observable data 72-1 and associated items 99-10 through 99-20 within the observable data 72-1 is described herein below:

Received: 2016-03-18 T 10:45:00 UTC on ACORP firewall "enforcer" (24.2.1.3) (reference 99-10)
Logged by user: JMB (reference 99-11)
Type: phishing (reference 99-12)
FQDN: http://www.att4.com (reference 99-13)
Sub type: IP address (reference 99-14)
Subtype Value: 168.138.1.3 (reference 99-15)
Network trace data file:
http://www.acorp.com/dumps/18Mar2016/trace10.html (reference 99-16)
Screen capture image:
http://wwww.acorp.com/dumps/18Mar2016/image01.html (reference 99-17)
Attachment MD5:
999076D89E2EFB2E36DDC6464D601833 (reference 99-18)
Comments: recipients of email reported suspicious "Subject:" line of email asking AT&T customers to access their accounts. (reference 99-19)
Remediation action: ACORP IT department quarantined and fixed one infected PC and added IP address and FQDN to block lists on firewall (reference 99-20)

Meta data 22-2 includes a subset of the items 99 within the observable data 72-1. As with the meta data 22 of the threat indicators 60, the items 99 within the meta data 22 of the observable indicators 70 characterize the observable events 50 and enable context-sensitive matching between threat indicators 60 of threat events 40 and observable indicators 70 of observable events 50. In the example, meta data 22-2 includes such items as item 99-12 for a "phishing" incident, item 99-13 for the FQDN of the phishing attempt, "www.att4.com," item 99-14 for sub type "IP address," and item 99-15 for Subtype value 168.138.1.3.

Returning to FIG. 4, in step 406, the control process 16 waits for observable indicators 70, where the observable indicators 70 can be pushed/downloaded from the policy engine 110. Each observable indicator 70 characterizes an associated observable event 50 in the security events database 130. In step 408, if observable indicator(s) 70 are received, the method transitions to step 410. Otherwise, the method transitions back to step 406.

In step 410, the control process 16 saves new observable indicators 70 to the observable indicators table 90, or updates existing observable indicators 70 within the observable indicators table 90. The control process 16 applies a time stamp to new observable indicators 70 or updates the time stamp of existing observable indicators 70. According to step 412, the control process 16 purges any observable indicators 70 from the observable indicators table 90 that are no longer temporally relevant by deleting entries, based on their timestamp, that are older than a predetermined age threshold relative to current time. In addition, as with the threat indicators table 80 in the method of FIG. 3, the control process 16 can provide additional housekeeping tasks upon the observable indicators table 90. This includes removal of observable indicators 70 from the observable indicators table 90 for observable events 50 which are no longer included in the security events database 130.

Figure 5A:
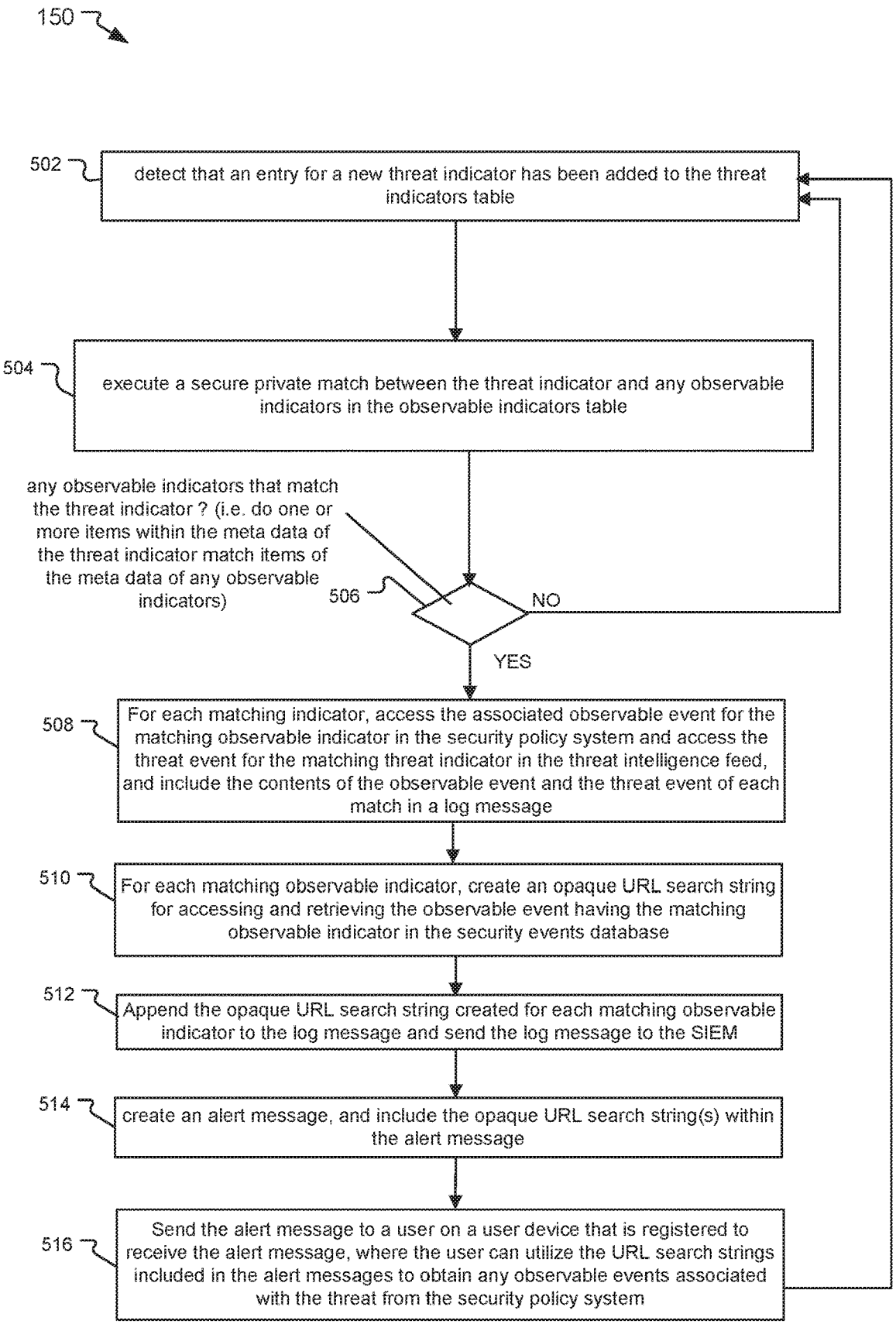
FIG. 5A is a flow diagram describing a method of the on-premises connector for executing a match between a new threat indicator obtained from the one or more threat intelligence feeds and any locally stored observable indicators within the on-premises connector.

FIG. 5A is a flow diagram describing yet another method of the on-premises connector 150. The method executes a match between a new threat indicator 60 that the on-premises connector 150 obtains from the one or more threat intelligence feeds 30, and any observable indicators 70 included within the observable indicators table 90 of the on-premises connector 150.

In step 502, the on-premises connector 150 detects that an entry for a new threat indicator 60 has been added to the threat indicators table 80. Then, in step 504, the on-premises connector 150 executes a secure private match between the threat indicator 60 and any observable indicators 70 in the observable indicators table 90. The term "secure private match" indicates that the matching process is secure because it does not involve requesting information for sensitive threat events 40 and observable events 50 across the internet 106, where it could be intercepted by unauthorized individuals, and private because the matching occurs within the confines of each business' enterprise network 122.

According to step 506, the on-premises connector 150 determines whether any observable indicators 70 match the threat indicator 60, i.e., determines whether one or more items 99 in the meta data 22 of the threat indicator 60 match any items 99 within the meta data 22 of any observable indicators 70. If there are no matching indicators, the method transitions back to step 502. Otherwise, the method transitions to step 508.

In step 508, for each matching indicator 60/70, the on-premises connector 150 accesses the associated observable event 50 for the matching observable indicator 70 in the security policy system 107; accesses the threat event 40 for the matching threat indicator 60 in the associated threat intelligence feed 30; and, includes the contents of the observable event 50 and the threat event 40 of each match in a log message. Then, in step 510, for each matching observable indicator 70, the on-premises connector 150 creates an opaque URL search string for accessing and retrieving the observable event 50 having the matching observable indicator 70 in the security events database 130. The opaque nature of the URL search string hides the identity of the user devices 102 within the enterprise networks 122 as the requesters of the observable events 50.

In step 512, the on-premises connector 150 appends the opaque URL search string created for each matching observable indicator 70 to the log message and then sends the log message via the message interface 18 to the SIEM 142 within the enterprise network 122.

Then, in step 514, the on-premises connector 150 creates an alert message, and includes the opaque URL search string(s) within the alert message. In step 516, the on-premises connector 150 sends the alert message to a user on a user device 102 that is registered to receive the alert message. The user can then utilize the URL search strings included in the alert messages to obtain any observable events 50 associated with the matching threat event(s) 40 from the security policy system 107.

Figure 5B:
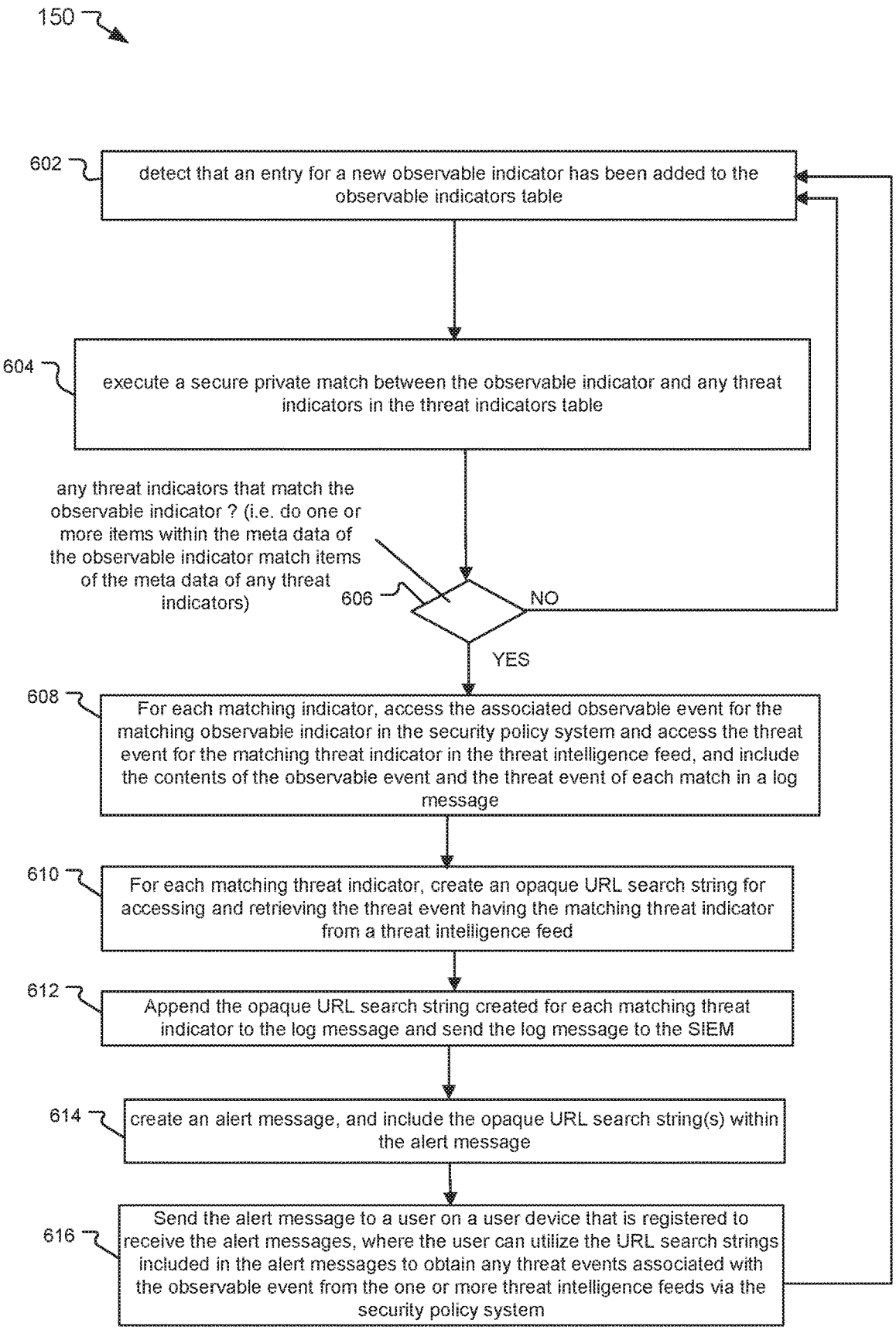
FIG. 5B is a flow diagram describing a method of the on-premises connector for executing a match between a new observable indicator obtained from the remote security policy system and any locally stored threat indicators within the on-premises connector.

FIG. 5B is a flow diagram describing still another method of the on-premises connector 150. The method executes a match between a new observable indicator 70 obtained from the security event database 130, and any threat indicators 60 included within the threat indicators table 80 of the on-premises connector 150.

In step 602, the on-premises connector 150 detects that an entry for a new observable indicator 70 has been added to the observable indicators table 90. Then, in step 604, the on-premises connector 150 executes a secure private match between the observable indicator 70 and any threat indicators 60 in the threat indicators table 80.

According to step 606, the on-premises connector 150 determines whether any threat indicators 60 match the observable indicator 70, i.e., determines whether one or more items 99 in the meta data 22 of the observable indicator 70 match any items 99 within the meta data 22 of any threat indicators 60. If there are no matching indicators, the method transitions to step 602. Otherwise, the method transitions to step 608.

In step 608, for each matching indicator 60/70, the on-premises connector 150 accesses the associated observable event 50 for the matching observable indicator 70 in the security policy system 107; accesses the threat event 40 for the matching threat indicator 60 in the associated threat intelligence feed 30; and, includes the contents of the observable event 50 and the threat event 40 of each match in a log message. Then, in step 610, for each matching threat indicator 60, the on-premises connector 150 creates an opaque URL search string for accessing and retrieving the threat event 40 having the matching threat indicator 60 from a threat intelligence feed 30.

In step 612, the on-premises connector 150 appends the opaque URL search string created for each matching threat indicator 60 to the log message and sends the log message via the message interface 18 to the REM 142 within the enterprise network 122.

Then, in step 614, the on-premises connector 150 creates an alert message, and includes the opaque URL search string(s) within the alert message. In step 616, the on-premises connector 150 sends the alert message to a user on a user device 102 that is registered to receive the alert message. In this way, users on user devices 102 can utilize the URL search strings included in the alert messages to obtain any threat events 40 associated with the observable event 50 directly from the threat intelligence feeds 30. The requests for the threat events 40 appear to the threat intelligence feeds 30 to have come from the on-premises connector 150 or other client interface through which the business normally accesses the threat intelligence feeds 30. The opaque nature of the URL search string also hides the fact that the requested threat indicator 60 in the URL search string is associated with a matching observable event 50 within a business' enterprise network 122.

While this invention has been particularly shown and described with references to preferred embodiments thereof, it will be understood by those skilled in the art that various changes in form and details may be made therein without departing from the scope of the invention encompassed by the appended claims.

What is claimed is:

1. A distributed security system that uses one or more threat intelligence feed repositories that store threat events associated with security incidents, the threat events including threat indicators for characterizing the threat events, the distributed security system comprising:
   a security policy system located outside an enterprise network, the security policy system storing observable events for security incidents detected by and sent from user devices located within the enterprise network, the observable events including observable indicators for characterizing the observable events, wherein the security policy system is located in a network that is remote to the enterprise network and that is remote to networks that include the one or more threat intelligence feed repositories; and
   an on-premises connector located within the enterprise network and executing on one of the user devices, the on-premises connector:
      receives the observable indicators from the security policy system located outside the enterprise network;
      receives the threat indicators from the one or more threat intelligence feed repositories located outside the enterprise network, the one or more threat intelligence feed repositories being subscription-based threat intelligence feed repositories that validate the on-premises connector as a legitimate subscriber;
      compares the observable indicators received from the security policy system with the threat indicators received from the one or more threat intelligence feed repositories located outside the enterprise network; and
      in response to determining that any observable indicators match any threat indicators, provides access to the threat events and the observable events having the matching indicators.

2. The system of claim 1, wherein the on-premises connector provides access to the threat events having the matching indicators by sending messages including the threat events associated with the matching indicators to users on the user devices or to event management systems.

3. The system of claim 1, wherein the on-premises connector provides access to the threat events having the matching indicators by:
   creating opaque URL query strings for accessing the threat events for the matching indicators in the one or more threat intelligence feed repositories; and
   sending the opaque URL query strings to users on the user devices or to event management systems.

4. The system of claim 1, wherein the on-premises connector provides access to the observable events having the matching indicators by:
   creating opaque URL query strings for accessing the observable events for the matching indicators in the security policy system; and
   sending the opaque URL query strings to users on the user devices or to event management systems.

5. The system of claim 1, wherein the on-premises connector is a software application executing upon at least one of the user devices within the enterprise network.

6. The system of claim 1, wherein the security policy system is accessed over a public network that the user devices access.

7. The system of claim 1, wherein the user devices include a runtime agent software application executing on the user devices, and wherein the runtime agent software application detects the security incidents and sends the observable events for the security incidents to the security policy system.

8. The system of claim 1, wherein the on-premises connector executes policy-based actions and maintenance operations on the received observable indicators and the threat indicators.

9. The system of claim 1, further comprising a Security Information and Event Manager (SIEM) located within the enterprise network, and wherein in response to the on-premises connector determining that any observable indicators match any threat indicators, the on-premises connector provides access to the threat events and the observable events having the matching indicators by including the threat events and the observable events in log messages, and sending the log messages to the STEM.

10. The system of claim 1, wherein the on-premises connector includes:
    a threat indicators table for locally storing the threat indicators of the threat events from the one or more threat intelligence feed repositories; and
    an observable indicators table for locally storing the observable indicators of the observable events from the security policy system.

11. The system of claim 1, wherein the threat events additionally include threat data that provide details of the threat events, and the observable events additionally include observable data that provide details of the observable events.

12. The system of claim 1, wherein the threat indicators include IP addresses, subject lines of email messages, fully qualified domain names (FQDNs), hashes calculated for files, sender addresses of the email messages, or Universal Resource Locators (URLs).

13. A method for retrieving information associated with security incidents from one or more threat intelligence feed repositories that store threat events associated with security incidents, the method comprising:
    receiving, from one or more user devices located within an enterprise network, detected observable events associated with security incidents, the observable events including observable indicators for characterizing the observable events;
    storing the observable events within a security policy system located outside the enterprise network, wherein the security policy system is located in a network that is remote to the enterprise network and that is remote to networks that include the one or more threat intelligence feed repositories;
    receiving, by an on-premises connector located within the enterprise network and executing on one of the user devices, the observable indicators from the security policy system located outside the enterprise network;
    receiving, by the on-premises connector, threat indicators of the threat events from the one or more threat intelligence feed repositories located outside the enterprise network, the one or more threat intelligence feed repositories being subscription-based threat intelligence feed repositories that validate the on-premises connector as a legitimate subscriber;
    comparing, by the on-premises connector, the observable indicators received from the security policy system with the threat indicators of the threat events received from the one or more threat intelligence feed repositories located outside the enterprise network;

matching, by the on-premises connector, the observable indicators to the threat indicators to determine matching indicators; and providing, by the on-premises connector, access to the threat events and the observable events having the matching indicators.

14. The method of claim 13, wherein providing access to the threat events having the matching indicators comprises sending messages including the threat events having the matching indicators to users on the user devices or to event management systems.

15. The method of claim 13, wherein providing access to the threat events having the matching indicators comprises:
creating opaque URL query strings for accessing the threat events for the matching indicators in the one or more threat intelligence feed repositories; and
sending the opaque URL query strings to users on the user devices or to event management systems.

16. The method of claim 13, wherein providing access to the observable events having the matching indicators comprises:
creating opaque URL query strings for accessing the observable events for the matching indicators in the security policy system; and
sending the opaque URL query strings to users on the user devices or to event management systems.

17. The method of claim 13, further comprising the security policy system being located in a public network that the user devices access.

18. The method of claim 13, wherein comparing the observable indicators from the security policy system with the threat indicators from the one or more threat intelligence feed repositories comprises:
storing the observable indicators obtained from the security policy system as local observable indicators within the on-premises connector of the enterprise network;
storing the threat indicators obtained from the one or more threat intelligence feed repositories as local threat indicators within the on-premises connector; and
comparing the local observable indicators against the local threat indicators.

19. The method of claim 13, further comprising the user devices including a runtime agent software application executing on the user devices, the runtime agent software application detecting the security incidents and sending the observable events for the security incidents to the security policy system.

20. The method of claim 13, further comprising executing, by the on-premises connector, policy-based actions and maintenance operations on the received observable indicators and the threat indicators.

21. The method of claim 13, wherein providing access to the threat events and the observable events having the matching indicators comprises:
including the threat events and the observable events in log messages; and
sending the log messages to a Security Information and Event Manager (SIEM) located within the enterprise network.

22. The method of claim 13, further comprising the threat indicators including IP addresses, subject lines of email messages, fully qualified domain names (FQDNs), hashes calculated for files, sender addresses of the email messages, or Universal Resource Locators (URLs).

23. The system of claim 1, wherein:
the security policy system is implemented as a Software as a Service (SaaS) system located in a network that is remote to the enterprise network and accessible to the enterprise network across a public network; and
the on-premises connector executes on at least one user device within the enterprise network, obtains the observable indicators from the security policy system, obtains the threat indicators from the threat intelligence feed repositories, and locally stores the obtained observable indicators and threat indicators.

24. A non-transitory computer readable media comprising computer executable instructions that on execution perform a method comprising:
receiving, from one or more user devices located within an enterprise network, detected observable events associated with security incidents, the observable events including observable indicators for characterizing the observable events;
storing the observable events within a security policy system located outside the enterprise network, wherein the security policy system is located in a network that is remote to the enterprise network and that is remote to networks that include one or more threat intelligence feed repositories;
receiving, by an on-premises connector located within the enterprise network and executing on one of the user devices, the observable indicators from the security policy system located outside the enterprise network;
receiving, by the on-premises connector, threat indicators of threat events from the one or more threat intelligence feed repositories located outside the enterprise network, the one or more threat intelligence feed repositories being subscription-based threat intelligence feed repositories that validate the on-premises connector as a legitimate subscriber;
comparing, by the on-premises connector, the observable indicators received from the security policy system with the threat indicators associated with the threat events received from the one or more threat intelligence feed repositories located outside the enterprise network;
matching, by the on-premises connector, the observable indicators to the threat indicators to determine matching indicators; and
providing, by the on-premises connector, access to the threat events and the observable events having the matching indicators.

* * * * *